United States Patent

[11] 3,595,513

| [72] | Inventor | Robert N. Rehlaender<br>149 Cervantes Road, Redwood City, Calif. 94062 |
|---|---|---|
| [21] | Appl. No. | 815,426 |
| [22] | Filed | Apr. 11, 1969 |
| [45] | Patented | July 27, 1971 |

[54] PORTABLE TEST INSTRUMENT LEVELER AND SUPPORT
6 Claims, 2 Drawing Figs.

[52] U.S. Cl. .................................................. 248/346,
108/1, 108/27, 248/148, 248/152
[51] Int. Cl. ...................................................... A47g 23/00
[50] Field of Search ............................................ 248/350,
148, 237, 152, 188.2, 346; 108/1, 27; 312/199, 200

[56] References Cited
UNITED STATES PATENTS

| 1,743,371 | 1/1930 | Montag | 248/237 X |
| 1,950,118 | 3/1934 | Lifton | 312/199 X |
| 2,882,810 | 4/1959 | Goetll | 248/148 X |
| 3,085,839 | 4/1963 | Gallagher | 312/33 |

*Primary Examiner*—Chancellor E. Harris
*Attorney*—Roland I. Griffin

ABSTRACT: A portable support having a flat, recessed top surface inclined at an oblique angle from the horizontal is provided with a lower lip for engaging the upper portions of the front and side panels of a first test instrument tilted backward at the same oblique angle. This lip holds the support in place on top of the tilted first test instrument so that the top surface of the support forms a level platform for supporting a second test instrument.

PATENTED JUL 27 1971          3,595,513

INVENTOR.
ROBERT N. REHLAENDER
BY Roland I. Griffin
ATTORNEY

PORTABLE TEST INSTRUMENT LEVELER AND SUPPORT

BACKGROUND AND SUMMARY OF THE INVENTION

This invention relates to a portable support for converting the top of a tilted test instrument to a useful level platform for supporting an additional test instrument or the like.

Test instruments, whether mounted on a mobile cart or supported on a laboratory workbench, are frequently tilted backward at an oblique angle from the horizontal to make it easier for the user to read and operate them. However, one drawback to tilting a test instrument in this manner is that its backward-sloping top surface can then no longer be used conveniently for such purposes as supporting another test instrument required in the test setup or serving as a work station for recording data or the like. This drawback results in inefficient use of space in many multiinstrument test setups.

Accordingly, it is the principal object of this invention to provide a portable support for converting the top of a tilted test instrument to a level platform that may be used for supporting an additional test instrument, as a work station for recording data, or for other such purposes.

This object is accomplished according to the preferred embodiment of this invention by providing an inclined plane support having a flat, slightly recessed top surface in a first plane and by providing the inclined plane support with a continuous lower lip along its front and bottom side edges in a second plane intersecting the first plane at an oblique angle substantially equal to the oblique angle at which a test instrument is tilted backward from the horizontal. The lower lip is shaped for engaging the upper portions of the front and side panels of the tilted test instrument to hold the support firmly in place on top of the test instrument and thereby provide a safe level platform for supporting another test instrument or some other such useful purpose.

DESCRIPTION OF THE PREFERRED EMBODIMENT

Figure 1:
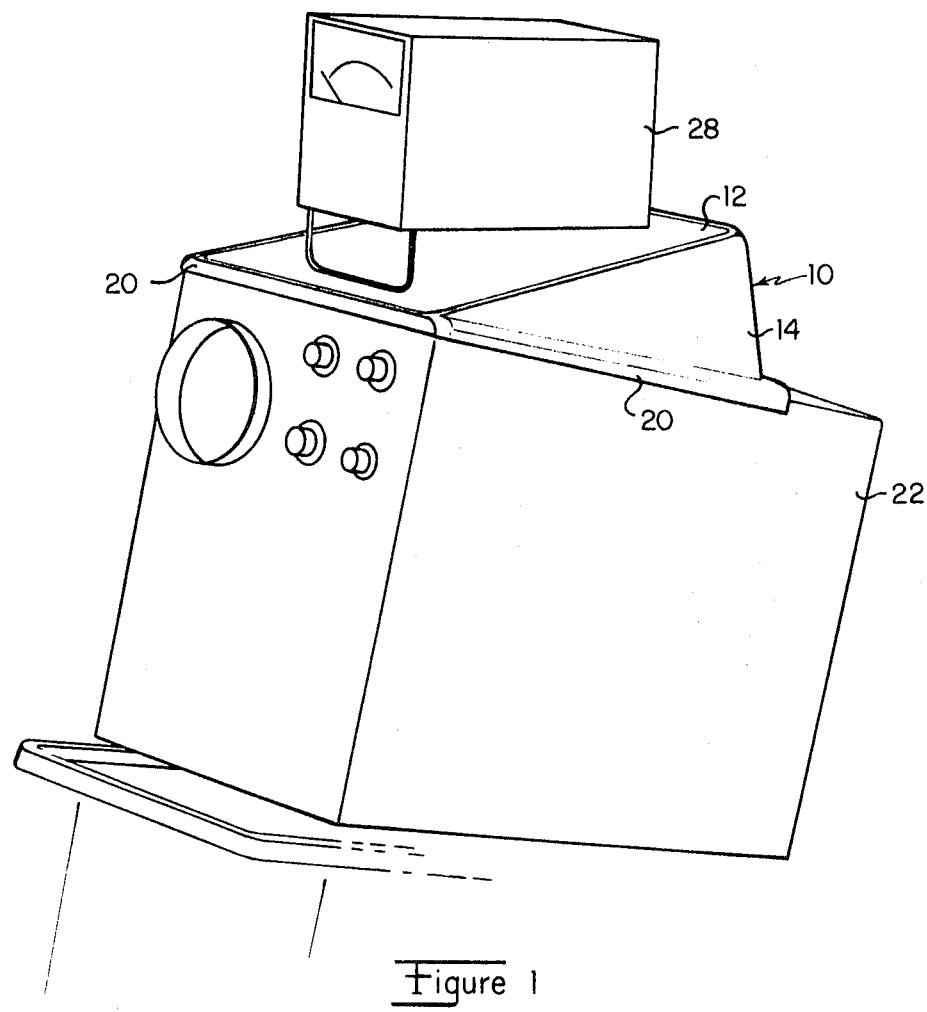
FIG. 1 is a front perspective view showing a test setup using a portable test instrument leveler and support in accordance with the preferred embodiment of this invention.
Figure 2:
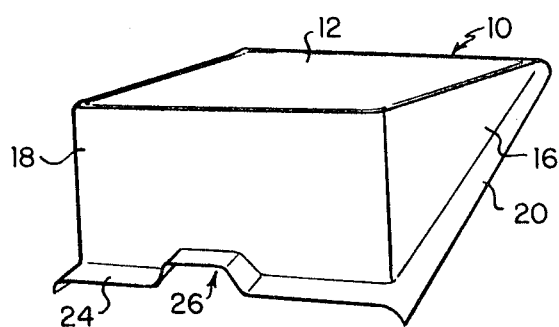
FIG. 2 is a rear perspective view of the portable test instrument leveler and support of FIG. 1.

Referring now to the drawing, there is shown a portable inclined plane support 10 having a flat generally rectangular top 12, flat generally triangular sides 14 and 16, and a flat rectangular back 18. The top 12 is slightly recessed to prevent objects that may be placed on it from rolling or sliding off when it is level. A continuous vertically downwardly extending lip 20 is formed along the front and lower side edges of the inclined plane support 10. This lip 20 is formed in a plane intersecting the plane of the flat recessed top 12 at an oblique angle about equal to the oblique angle at which a test instrument, such as an oscilloscope 22 mounted on a mobile cart, is to be tilted to facilitate reading and operating the test instrument. Lip 20 is generally flat along the front edge of inclined plane support 10 and arcuate along the lower side edges of the inclined plane support and is shaped for engaging the flat upper portion of the front and the rounded upper portions of the side panels of the tilted test instrument to hold the inclined plane support 10 firmly in place on top of the tilted test instrument 22 and thereby provide a safe level platform. A flat horizontally outwardly extending lip 24 is also provided along the lower back edge of the inclined plane support 10 to provide the support with greater strength and to provide a larger bearing surface on the top of the tilted test instrument 22. Both the flat back 18 and the flat lip 24 are provided with a central recess 26 for receiving a center strap typically attached to the top of the test instrument 22. The inclined plane support 10 may be formed in one piece from a material such as plastic. The safe level platform provided by the inclined plane support 10 may be used for such purposes as supporting another test instrument 28 on top of the tilted test instrument 22 or serving as a work station for recording data.

I claim:

1. A portable support for use on the top of a test instrument tilted at an oblique angle from the horizontal, said support comprising a flat top surface disposed in a first plane, and a depending lip disposed in a second plane intersecting the first plane at about the same oblique angle for engaging the upper portions of front and side panels of the tilted test instrument to hold the support in place on top of the tilted test instrument and thereby provide a substantially level platform.

2. A portable support as in claim 1 wherein said top surface is recessed.

3. A portable support as in claim 2 wherein said top surface is generally rectangular, said support includes a generally rectangular back and a pair of triangular sides, and said lip is continuously disposed along the front edge of said top surface and the lower edges of said sides.

4. A portable support as in claim 3 wherein said lip is flat along the front edge of said top surface and arcuate along the lower edges of said sides, said back is provided with a central recess, and said support includes a flat lip along the lower edge of said back.

5. A portable support as in claim 1 wherein said support further comprises a pair of vertically tapered sides increasing in width from the front edge of said top surface, and said lip comprises a vertically downwardly extending lip disposed along the front edge of said top surface and the lower edges of said tapered sides for engaging the top and the adjoining upper front and side portions of the test instrument to hold the support in place on the top of the tilted test instrument.

6. A portable support as in claim 5 wherein said support still further comprises a back and a flat horizontally extending lip disposed along the lower edge of said back for abutment upon the top of the tilted test instrument.